(12) United States Patent
Tribout et al.

(10) Patent No.: US 9,046,209 B2
(45) Date of Patent: Jun. 2, 2015

(54) UNDERWATER ELBOW CONNECTION PIPE INCLUDING HEAT INSULATION

(75) Inventors: Julien Tribout, Saint Germain en Laye (FR); Julien Verdeil, Paris (FR)

(73) Assignee: SAIPEM S.A., Montigny le Bretonneux (FR)

( * ) Notice: Subject to any disclaimer, the term of this patent is extended or adjusted under 35 U.S.C. 154(b) by 1035 days.

(21) Appl. No.: 13/132,474

(22) PCT Filed: Nov. 25, 2009

(86) PCT No.: PCT/FR2009/052298
§ 371 (c)(1),
(2), (4) Date: Jun. 2, 2011

(87) PCT Pub. No.: WO2010/063922
PCT Pub. Date: Jun. 10, 2010

(65) Prior Publication Data
US 2011/0232799 A1    Sep. 29, 2011

(30) Foreign Application Priority Data

Dec. 3, 2008 (FR) .................................... 08 58214

(51) Int. Cl.
*F16L 9/18* (2006.01)
*F16L 9/14* (2006.01)
(Continued)

(52) U.S. Cl.
CPC ............... *F16L 59/145* (2013.01); *F16L 59/22* (2013.01)

(58) Field of Classification Search
CPC ....... F16L 59/143; F16L 59/145; F16L 59/12; F16L 59/22

USPC ........... 138/149–151, 154; 428/36.5; 166/50, 166/57, 60, 344, 345, 347; 405/167, 170
See application file for complete search history.

(56) References Cited

U.S. PATENT DOCUMENTS 2,962,051 A * 11/1960 Burkes, Jr. .................... 138/149
2,964,064 A * 12/1960 Jones ............................. 285/47
4,054,985 A * 10/1977 Aleniusson ................... 29/416
(Continued)

FOREIGN PATENT DOCUMENTS

DE    3345371    6/1985
FR    2821143    8/2002
(Continued)

OTHER PUBLICATIONS

International Search Report dated Apr. 27, 2010.

*Primary Examiner* — Patrick F Brinson
*Assistant Examiner* — Matthew Lembo
(74) *Attorney, Agent, or Firm* — Cozen O'Connor

(57) ABSTRACT

A thermally insulating undersea junction pipe providing a junction between two thermally insulating undersea pipe portions. The junction pipe having a rigid bent inner pipe and presenting a radius of curvature that is three to ten times its outside diameter and coated in a thermally insulating material. The junction pipe having an outer jacket surrounding the inner pipe, the jacket being made of flexible or semirigid material matching the bent shape of the inner pipe in coaxial manner The tubular wall of the outer jacket including structural reinforcing elements of annular or helical shape suitable for enabling the tubular wall of the outer jacket to be bent while keeping its cross-section substantially uniform. A quasi incompressible thermally insulating material in the form of a gel is disposed to completely filling the annular space between the inner pipe and the outer jacket.

14 Claims, 4 Drawing Sheets

(51) Int. Cl.
  *F16L 59/14* (2006.01)
  *F16L 59/22* (2006.01)

(56) References Cited

U.S. PATENT DOCUMENTS

| | | | | |
|---|---|---|---|---|
| 4,478,253 A | * | 10/1984 | Everett | 138/140 |
| 4,620,818 A | * | 11/1986 | Langner | 405/169 |
| 4,906,137 A | * | 3/1990 | Maloberti et al. | 405/224.3 |
| 6,343,624 B2 | * | 2/2002 | Neumann | 138/149 |
| 6,854,930 B2 | * | 2/2005 | Pionetti | 405/172 |
| 6,883,548 B2 | * | 4/2005 | Schippl | 138/112 |
| 6,981,525 B2 | * | 1/2006 | Foxton | 138/112 |
| 7,025,093 B2 | * | 4/2006 | Bonnet et al. | 138/149 |
| 2008/0121304 A1 | * | 5/2008 | Carlier et al. | 138/149 |

FOREIGN PATENT DOCUMENTS

| | | |
|---|---|---|
| FR | 2826051 | 12/2002 |
| NL | 7607158 | 1/1977 |
| WO | WO 2004/003424 | 1/2004 |

\* cited by examiner

UNDERWATER ELBOW CONNECTION PIPE INCLUDING HEAT INSULATION

PRIORITY CLAIM

This is a U.S. national stage of application No. PCT/FR2009/052298, filed on Nov. 25, 2009. Priority is claimed on the following application: France Application No.: 08 58214 Filed on Dec. 3, 2008, the content of which is/are incorporated here by reference.

FIELD OF THE INVENTION

The present invention relates to an undersea junction pipe including peripheral insulation, in particular an undersea pipe for conveying hot or cold fluids, and preferably an undersea pipe for use at great depths.

In most industrial fields, it is desirable to have high performance insulating systems for maintaining fluids that are being conveyed in pipework at a temperature that is constant so that transfers between pieces of equipment can be achieved over distances that are considerable, e.g. reaching several hundreds of meters, or indeed several kilometers. Such distances are common practice in industries such as oil refineries, liquefied natural gas installations (at−165° C.), and undersea oil fields which may extend over several tens of kilometers. Such oil fields are being developed in ever-increasing depths of water, which depths may exceed 3000 meters (m).

The present invention relates in particular to a junction pipe between insulated undersea pipe elements installed on oil fields at very great depths, in particular between a pipe resting on the sea bottom and a bottom-to-surface connection pipe suspended between a surface ship anchored over said oil field and the bottom of the sea.

BACKGROUND OF THE INVENTION

Crude oil generally leaves well heads at temperatures in the range 45° C. to 75° C., or even higher, and said well heads are often horizontally several kilometers away from the surface support that is to receive and process the crude oil, while the sea water is at a temperature of about 3° C. to 5° C. Furthermore, in a depth of water reaching or exceeding 2000 m to 3000 m, it is desirable to keep the crude oil at a temperature higher than 30° C.-35° C. until it reaches the surface in order to avoid forming plugs of paraffin or of gas hydrates, which would block production. This therefore requires continuous high performance thermal insulation of the bottom-to-surface connection pipe conveying the crude oil.

Numerous types of insulated pipe have therefore been developed, and in particular so-called pipe-in-pipe (PiP) type pipes in which an inner pipe conveys the fluid and an outer pipe arranged coaxially around the inner pipe, also known as the "outer jacket", is in contact with the surrounding medium, i.e. water. The annular space between the two pipes may be filled with an, insulating material or it may be evacuated.

Those systems have been developed to achieve a high degree of thermal performance and specific versions have been developed so as to be particularly adapted to great depths, i.e. so as to be capable of withstanding the pressure at the sea bottom. Since the pressure of water is substantially 0.1 megapascals (MPa), i.e. about 1 bar, for every 10 m of depth, the pressure that the pipe needs to be capable of withstanding is about 10 MPa, i.e. about, 100 bars, for every 1000 m of depth, and about 30 MPa or about 300 bars for 3000 m.

Such high performance pipes are used to constitute the main running lengths both of pipes resting on the sea bottom and of bottom-to-surface connection pipes, but in general they are not suitable for use in constituting singular junction elements known as "spool pieces" or indeed junction pipes, since such pipe elements generally present shapes that are complicated, including a plurality of bends that need to be fabricated after the undersea pipes and the bottom-to-surface connection installation have been laid.

Outer pipe insulating means are known that withstand high hydrostatic pressures and that are therefore suitable for being used when immersed at great depths, being constituted by:

quasi incompressible solid polymer material coverings based on polyurethane, polyethylene, polypropylene, etc., that, where appropriate, are in the form of a solid tubular sleeve. However, such materials present thermal conductivity and thermal insulation properties that are relatively poor, and insufficient to avoid the above-mentioned drawbacks of plugs forming in the event of production being stopped in an undersea pipe conveying hydrocarbons; or coverings of synthetic materials made up of hollow beads containing a gas and capable of withstanding the external pressure, the beads being embedded in binders such as concrete, epoxy resin, and in particular coverings known as syntactic foams, etc., having thermal insulation properties that are better, but that are considerably more expensive and more difficult to fabricate and to install. Recourse is made to half-shells that are assembled around the assembly weld that needs to be protected after the welding has been performed. However, it is then necessary to fill the gape between the shells in such a manner as to avoid forming any localized thermal bridges. In another embodiment, the pipe or pipe portions have insulation molded directly thereon so as to obtain insulation without discontinuity at the periphery, however, that method presents the drawback of being the subject of cracking due to the large temperature gradient between the pipe, generally at a temperature in the range 50° C. to 85° C., and the surrounding sea water in contact with the outer jacket, which is at a temperature of 3° C. to 5° C.

Insulating materials are also known that have better thermal insulating properties, i.e. lower thermal conductivity associated with phase-change properties. Insulating phase-change materials (PCM) are implemented in particular in WO 00/40886 and WO 2004/003424, however, those insulating PCMs that are capable of adopting a liquid state need to be confined in an absorbent material, as described in WO 00/10886 or they need to be confined in pockets, as described in WO 2004/003424.

Those thermally insulating coverings are themselves covered in a semirigid continuous tubular outer jacket. However, in the prior art, the embodiments described are limited to fabricating straight pipes and they are not adaptable to fabricating pipes with bends. Those embodiments are not adaptable to thermally insulating junction pipes with bends because of the structure of the outer jacket, which as described cannot be deformed to extend coaxially about the inner pipe and does not enable a substantially constant thickness of insulating material to be obtained, in particular in bend zones.

Other insulating materials in gel form have also been described, in particular in patents FR 2 800 915, FR 2 820 426, and FR 2 820 752. More particularly, those insulating gels are constituted by a complex comprising a first compound that presents thermal insulation properties and that is mixed with a second compound consisting in a gelling or structuring-effect compound, in particular one that operates by curing, such as a polyurethane compound, said first compound being in the form of particles or microcapsules that are dispersed within a matrix of said gelled or cured second compound, said matrix thus confining said insulating first compound that might possibly be in the form of a liquid, thereby greatly reducing convection phenomena.

Said first compound may itself be a phase-change compound such as paraffin, other compounds in the alkane family, such as waxes, bitumens, tars, fatty alcohols, glycols, and still more particularly any compound having a melting temperature lying between the temperature $t_2$ of the hot effluent flowing in the inner pipe and the temperature $t_3$ of the medium surrounding the pipe in operation, i.e. in general a melting temperature lying in the range 20° C. to 80° C.

However, the first compound may be an insulating material that does not change phase, such as kerosene.

In prior embodiments, such insulating gels are confined between a steel inner pipe and a flexible or semirigid outer protective jacket, but only for pipe portions that are straight.

For that purpose, previously-prepared tubular jackets are placed on one another by being threaded coaxially, and the gel is injected into the annular space after the ends of said tubular jackets have been closed.

That method is not applicable to pipe portions having bends, since the flexible outer jacket cannot be bent to the required radius of curvature without being folded or kinked, thereby causing the cross-section of the outer jacket to lose its circular and concentric shape about the inner pipe. That gives rise to reductions in the thickness of the inside annular space between the inner pipe and the outer jacket and thus to localized reductions in thermal insulation through said annular space.

SUMMARY OF THE INVENTION

The object of the present invention is thus to provide improved thermally insulated junction pipes with bends that are easy to fabricate and that present good thermal insulation properties.

To do this, the present invention provides a thermally insulating undersea junction pipe providing a junction between two thermally insulating undersea pipe portions, said junction pipe comprising a rigid bent inner pipe, preferably made of steel, and presenting a radius of curvature that is three to ten times its outside diameter, preferably four to five times its outside diameter, and coated in a thermally insulating material comprising:

an outer jacket surrounding said inner pipe, the jacket being made of flexible or semirigid material matching the bent shape of said inner pipe in coaxial manner; and
the tubular wall of said outer jacket including structural reinforcing elements of annular or helical shape suitable for enabling said tubular wall of the outer jacket to be bent while keeping its cross-section substantially uniform, preferably substantially circular, and coaxial with the cross-section of said inner pipe, in spite of being bent to match the bent outline of said inner pipe with its said radius of curvature.

According to the present invention, said bent junction pipe further comprises:

a plurality of support elements, referred to as centralizer elements, made of rigid plastics or composite material interposed between said inner pipe and said outer jacket so as to keep the cross-sections of said outer jacket and said inner pipe substantially coaxial, said centralizer elements being spaced apart in the axial direction of said pipe at intervals of at least 1 m, preferably of at least 3 m to 10 m;

a plurality of longitudinal guide elements made of rigid or semirigid material placed at a substantially constant distance from the surface of the bent inner pipe, extending between two successive centralizer elements having the ends of said longitudinal guide elements resting on the peripheries thereof, preferably at least four of said guide elements being regularly distributed around the peripheries of said centralizer elements; and a quasi incompressible thermally insulating material in the form of a gel completely filling the annular space between said inner pipe and said outer jacket.

The term "bent pipe" is used herein to mean a pipe that includes at least one segment presenting a bend with a given radius of curvature, preferably between two straight segments disposed likewise preferably at 90° to each other, but possibly being disposed at some other angle, generally an angle lying in the range 45° to 120°.

The term "radius of curvature" is used to mean the radius of curvature of the neutral axis of the inner pipe, i.e. of the axis of said inner pipe.

It should be understood that said structural elements of annular or helical shape constitute structural reinforcing elements in that they serve to keep the cross-section of the tubular wall of the outer jacket in shape when it is threaded around the inner pipe from one of its ends in order to follow the radius of curvature of the inner pipe in a coaxial manner thereabout.

It can thus be understood that the curvature of the outer jacket presents the same center of curvature and the same radius of curvature as the curvature of the inner pipe at a given bend, and thus that the radius of the curvature of the outer jacket is equal to three to ten times the outside diameter of the inner pipe and preferably to four to five times its outside diameter.

It can be understood that said longitudinal guide elements follow the curvature of the surface of the bent inner pipe and since they are made of rigid or semirigid material they are suitable for supporting said flexible outer jackets without significantly deforming, i.e. without deforming by more than a few millimeters.

It can also be understood that said guide elements enable the flexible outer jacket to retain a cross-section that is substantially uniform in spite of its flexibility, and that is preferably substantially circular between two centralizer elements, and furthermore said guide elements facilitate advancing the flexible jacket when it is threaded around the inner pipe without its threading advance being impeded by said centralizer elements, in particular in the bend portions.

Said longitudinal guide elements may be constituted by section members of composite plastics material or equally well of steel, in particular flat bars resting flat on the outside surfaces of centralizer collars to which they may be screwed. Insofar as the guide elements come into contact solely with the outer jacket and not with the inner pipe, they need not necessarily be made of a thermally insulating material. They may be rigid or semirigid so as to be capable of supporting said outer jacket without deforming.

In the present invention, it is possible to implement an outer jacket that is relatively flexible, firstly because of the presence of said longitudinal guide elements around the bent inner pipe, and secondly because the thermally insulating material used is a material in gel form that is quasi incompressible.

By making use of such longitudinal guide elements, it is possible, firstly, to use outer jackets that are very flexible, which is advantageous for making them easier to install around steel inner pipes with bends, and regardless of the amount of curvature.

Secondly, these guide elements contribute to keeping a substantially uniform cross-section for the outer jacket in spite of it being curved to follow the bent outline of the inner pipe, thus making it possible to obtain a layer of insulating material filling the annular space between the inner pipe and the outer jacket that is of substantially constant thickness and thus that provides insulating properties that are well-controlled and substantially constant over the entire length of the bent pipe.

Finally, a flexible jacket provides sufficient mechanical protection when used in association with an insulating material in the form of an insulating gel that is quasi incompressible.

It is thus the combination of using longitudinal guide elements and an insulating material in the form of an incompressible insulating gel that makes it possible, in accordance with the present invention, for a flexible outer jacket to be used that is easy to put into place.

Because of the quasi incompressible nature of the insulating gel, implementing a flexible jacket suffices to provide the gel with mechanical protection.

Finally, implementing this type of insulating gel as an insulating material is advantageous in that it is obtained from reagents that can be injected while in liquid form so as to set subsequently by curing to form the gel in situ.

Simultaneous implementation of said guide elements and said flexible jacket make it relatively easy to fabricate a bent pipe in accordance with the invention.

In a first variant embodiment, said outer jacket presents an extruded solid tubular wall and said structural reinforcing elements are elements of annular shape constituted by recessed grooves, corrugations, or fluting regularly spaced apart in the longitudinal axial direction of said tubular wall of circular cross-section.

More particularly, said structural reinforcing elements of the solid tubular wall of the flexible or semirigid outer jacket are constituted by hollow corrugations possessing a depth and a width lying in the range 1 centimeter (cm) to 2 cm, the corrugations being spaced apart by a length of at least 5 cm, preferably lying in the range 5 cm to 10 cm, said solid tubular wall presenting a thickness lying in the range 1 millimeter (mm) to 5 mm and being made of a plastics material, preferably polypropylene.

In a second variant embodiment, said tubular wall is constituted by a spiral winding of a strip or ribbon of plastics material or of flexible fabric coated in a polymer including a said structural reinforcing element of helical shape constituted by a wire or string of iron or semirigid plastics material, preferably a wire or string having a diameter of 1 mm to 8 mm that is adhesively bonded or heat-sealed onto the outside surface of the ribbon or that is preferably embedded in the mass of the material constituting said ribbon, thereby forming a projection at the outside surface of said ribbon.

The outer jackets constituted by a corrugated solid tubular wall or said ribbons having longitudinal elements on their surfaces or embedded therein are known to the person skilled in the art, in particular for making ducts or conduits in the field of building or public works, in particular ducts for confining electric cables or ventilation ducts.

This second embodiment with a spirally-wound ribbon is preferred since it makes it easier to fabricate an outer jacket of desired diameter on site, in particular from a supply of strips.

Implementing an outer jacket configured coaxially in this way around said inner pipe in association with an insulating material in the form of a gel contributes to conferring a substantially constant thickness to a layer of insulating material, thereby ensuring that it has well-controlled insulating properties that are substantially constant over the entire periphery and along the entire length of the pipe. Because of the quasi incompressible nature of the insulating gel, a flexible or semirigid jacket suffices to give mechanical protection to the insulating material. In addition, such insulating gels are advantageous in that they can be obtained from physical and chemical reactions between different components that are capable of being injected in liquid form after the components have been mixed together so as to occupy the space between the inner pipe and the outer jacket of the junction pipe, and subsequently set by curing to form the gel in situ.

Because the insulating material is quasi incompressible in the form of a gel, i.e. amongst other things, it does not contain any free gas, the flexible or semirigid material of the outer jacket, which is subjected to the hydrostatic pressure at great depth, is supported by the gel so that said flexible or semirigid material of the tubular wall of the outer jacket does not need to possess intrinsic mechanical strength as great as that of a pipe made of steel.

The term "jacket of semirigid material" is used herein to mean a material that is sufficiently rigid to maintain its shape in spite of the weight of the insulating material confined within the jacket, while also presenting a certain amount of flexibility so as to accommodate deformation while it is being put into place around the inner pipe, and, where applicable, so as to follow the deformations that result from a change in the volume of the insulating material as a result of a possible phase-change thereof, when the material is a phase-change material.

The term "tubular wall" is used to mean that said outer jacket and inner pipe may present a cross-section in a direction perpendicular to the longitudinal axis XX' of said jacket that its circular, oval, or indeed polygonal in shape, but that is preferably circular in shape.

Oval or polygonal shapes are more particularly suitable when the quasi incompressible insulating material is a phase-change material such that the walls can then deform more easily in order to accommodate the increase in volume as a result of the insulating material changing phase, where appropriate, by tending towards a more circular shape.

More particularly, the undersea junction pipe of the invention is constituted by:
  a steel inner pipe having a thickness of 8 mm to 35 mm and an outside diameter lying in the range 100 mm to 600 mm; and
  an outer jacket having a thickness of 1 mm to 8 mm and an inside diameter of 120 mm to 1000 mm, with
  an insulating material presenting thickness of 10 mm to 200 mm.

More particularly, the junction pipe includes leaktight centralizer elements preferably having closable orifices enabling the space between two successive leaktight centralizer elements to be filled with fluid insulating material, there being at least one leaktight centralizer element at each end, preferably at least one leaktight centralizer element every at least 1 m, preferably. every 3 m to 10 m, and non-leaktight centralizer elements including openings allowing insulating material fluid to flow through said openings in said non-leaktight centralizer elements while filling between two consecutive leaktight centralizer elements.

The term "leaktight centralizer element" is used herein to mean that when said outer jacket is pressed against said leaktight centralizer elements and fastened thereto, in particular using external binder means, said centralizer elements do not allow fluid to flow through a said leaktight centralizer element, and thus beyond a compartment situated between two consecutive leaktight centralizer elements. This enables filling with said insulating material in liquid form to be confined to the space between two consecutive leaktight centralizer elements prior to the liquid gelling by curing. Thus, it is possible to completely fill the volume between two leaktight centralizers before any significant gelling in the bulk of the insulating material has time to begin.

More particularly, said centralizer elements are constituted by collars of rigid material placed around and against said inner pipe and having said outer jacket resting thereagainst.

It can be understood that such centralizer elements also contribute both to conferring mechanical strength to the outer jacket, in particular when the bent junction pipe rests on the sea bottom, and to maintaining a substantially constant thickness of the insulating material confined between said inner pipe and outer jacket. In addition, the constitution of the plastics or composite material confers thermal insulation to the centralizer element that is substantially comparable to the thermal insulation of the insulation material that fills the volume defined by two successive centralizer elements and said inner pipe and said outer jacket, thus avoiding any thermal bridges between the inner pipe and the outer jacket.

Preferably, said insulating gel comprises a first compound presenting thermal insulating properties, such as alkanes, having a hydrocarbon chain with at least six carbon atoms, preferably at least ten carbon atoms, mixed with a second compound consisting in a gelling or structuring-effect polymer compound operating in particular by curing, such as a compound of the polyurethane, polypropylene, polyethylene, or silicone type, said first compound preferably being in the form of particles or microcapsules dispersed within a matrix of said gelled or cured second compound, said matrix thereby confining said insulating first compound.

These insulating gels present the advantage of being capable of being implemented in the liquid state and of transforming after a few hours into a gel, in which the insulating compound is microencapsulated within a matrix of the second compound that acts as a kind of sponge suitable for confining the insulating material and for keeping it in a shape of substantially constant thickness, thereby greatly reducing convection phenomena, and where appropriate absorbing variations in volume if the insulating material is a phase-change material.

More particularly, said first compound presenting thermal insulation properties may be a phase-change insulating material, in particular alkanes or alcohols presenting a hydrocarbon chain of at least fourteen carbon atoms, such as paraffins, waxes, bitumen, tar, fatty alcohols, or indeed glycols. Under such circumstances, the gelling second compound may absorb a large amount of the volume variations of the first compound when changing phase.

These insulating phase-change materials are advantageous since they behave like heat accumulators capable of returning energy on solidifying and conversely capable of absorbing energy on melting. When they return accumulated energy, these materials thus allow the duration of production stops to be increased without running the risk of pipes becoming clogged as a result of premature cooling of their content.

The phase-change material advantageously presents a liquid/solid melting temperature $t_0$ lying in the range 20° C. to 80° C., higher than the temperature $t_1$ at which the fluid flowing inside the pipe presents an increase in viscosity that is harmful for its own flow in the pipe, and lower than the temperature $t_2$ at which the fluid flows in the pipe in normal operation.

In a particular embodiment, said insulating gel is a mixture of kerosene and of polyurethane.

Kerosene is constituted mainly by an alkane presenting a carbon chain of at least ten carbon atoms and not presenting any phase-change properties.

Insulating gels of this type present the following physicochemical characteristics:
 they are constituted by an insulating compound,; optionally a phase-change compound, dispersed within a sponge-forming cured matrix with leaktight microscopic hollow cells;
 the matrix cures either in a physical manner, or in a chemical manner, or indeed in a physicochemical manner, said curing taking place after several hours, either at ordinary temperature (10° C. to 25° C.), or by overall heating;
 the gels obtained in this way present hardness on the Shore scale in the range A20 to A80 depending on the type of matrix; and
 their thermal conductivity lies in the range 0.130 watts per meter kelvin (W/mK) to 0.150 W/mK.

In order to enable it to be connected to said thermally insulated undersea pipe portions that it joins together, said junction pipe of the invention advantageously includes a coupling element at each end, preferably a male or female portion of an automatic connector.

In a preferred embodiment, a junction pipe of the invention includes at least two bent pipe segments spaced apart by at least one straight pipe segment, preferably at least three bent segments and at least two straight segments between said bent segments.

As explained above, this embodiment with a plurality of bends gives the junction pipe flexibility that accommodates possible relative movements between the ends of the pipes that it joins together, associated with said pipes expanding or contracting as a result of the heat flows they convey, and also as a result of movements of said pipes due to the bottom effect when the pipes resting on the sea bottom are subjected to pressure variations.

In a particular embodiment, a junction pipe of the invention includes at least one straight segment of outer jacket made of a rigid plastics material ($5_3$).

The present invention also provides a fabrication method, in which the following steps are performed:
 1) preferably applying centralizer elements, preferably regularly spaced apart, to the surface of a said bent inner pipe using at least two leaktight centralizer elements located respectively at each end and preferably non-leaktight centralizer elements between the end leaktight centralizer elements;
 2) preferably applying said longitudinal guide elements extending over and between said successive centralizer elements on which they rest and, where appropriate, are fastened;
 3) threading a said flexible or semirigid outer jacket around said inner pipe, the ends of said outer jacket preferably being bound around and against at least said end centralizer elements; and
 4) completely filling the empty space between said inner pipe and said outer jacket with a said thermally insulating material poured in in the liquid state, preferably via closable orifices in said leaktight centralizer elements.

In the method of the invention, a said junction pipe is fabricated comprising a plurality of bend segments and a plurality of straight segments, the method being characterized in that it comprises the following steps:
 1) making two portions of said inner pipe, each portion including at least one bend segment, preferably at least two bend segments, and at least one straight segment, preferably at least two straight segments;

2) applying said centralizer elements to said inner pipe portions and said guide elements to said centralizer elements, preferably with leaktight centralizer elements defining the ends of each of the bend and straight segments;

3) threading segments of said flexible or semirigid outer jacket around said bend or straight segments of said inner pipe portions over said centralizer elements and said guide elements;

4) securing said outer jacket segments, preferably via said leaktight centralizer elements at the ends of each of said straight and bend segments of the inner, preferably with the exception of a first end segment of at least one of said junction pipe portions as made in this way, so as to enable said outer jacket end to be folded back from the weld zone of step 5);

5) assembling together two ends of said two inner pipe portions together end to end by welding;

6) joining together the ends of two terminal segments of said flexible or semirigid outer jackets in register with the weld zone of step 5); and 7) filling said empty spaces between said outer jacket segments and said inner pipe segments with thermally insulating materials poured in liquid form, preferably via closable orifices in said leaktight centralizer elements at the end of said segments.

BRIEF DESCRIPTION OF THE DRAWINGS

Other characteristics and advantages of the present invention appear in the light of the following detailed description with reference to the following figures, in which.

DETAILED DESCRIPTION OF THE PRESENTLY PREFERRED EMBODIMENTS

Figure 1:
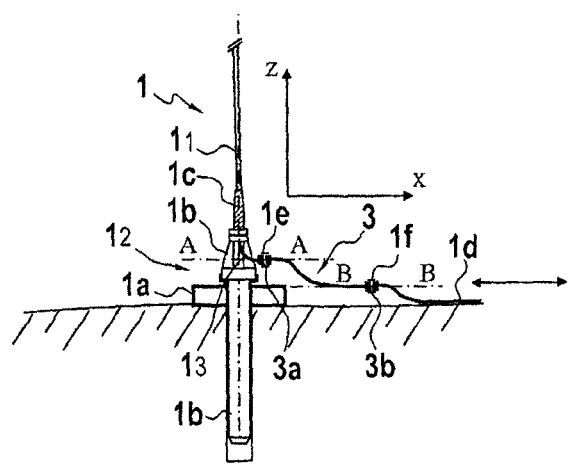
FIG. 1 is a section and side view showing an insulated junction pipe of the invention installed between an anchoring base for a bottom-to-surface connection pipe and an insulated pipe resting on the sea bottom.

FIG. 1 shows an anchoring base $1_2$ in side view and in section for a bottom-to-surface connection pipe 1, the base comprising a platform $1a$ resting on the sea bottom 2, said platform being anchored by a post $1b$ and said platform supporting a structure $1b$. The structure $1b$ supports an engagement device $1c$ both for engaging the bottom end $1_1$ of the pipe 1 and for engaging the support structure $1b$, and it holds in position a portion of bent pipe $1_3$ connected to the bottom end $1_1$ of the bottom-to-surface connection pipe 1. Insulation of this type is described in earlier patent applications in the name of the Applicant and in particular WO 02/066786 and WO 2003/095788.

In known manner, the bottom-to-surface connection pipe comprises a substantially vertical upright column referred to as a "vertical riser" extending from said base $1_2$ up to the subsurface and connected to a support floating on the surface via plunging flexible pipe in the form of a catenary. The top end of the vertical riser at the subsurface where it has its junction with said flexible pipe is kept under tension by a float that is not shown. The free end of the portion of bent pipe $1_3$ held by the base $1_2$ includes a male or female portion of an automatic connector $1e$. A junction pipe 3 including a plurality of bends provides a junction between the connector element $1e$ at the end of the portion of bent pipe $1_3$ and the end if of a pipe resting on the sea bottom $1d$.

Figure 2:
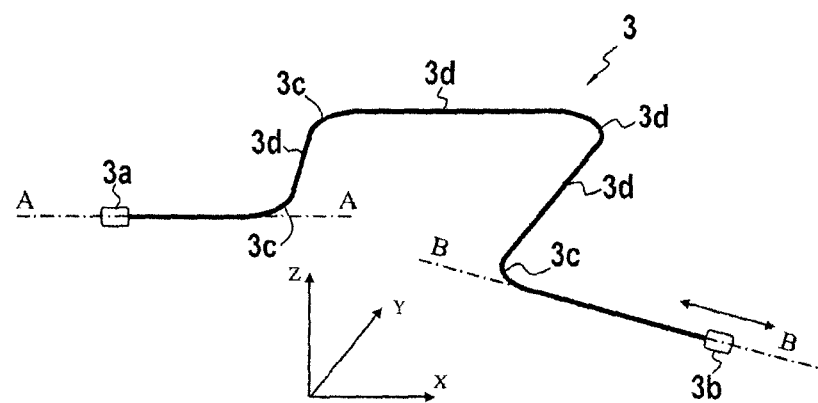
FIG. 2 is a perspective view of an insulated junction pipe of the invention, with reference to FIG. 1.

Said junction pipe 3 is shown in perspective in FIG. 2 and it has four bends $3c$ making multiple and large changes of direction possible given the insulation conditions and the operating conditions that apply to the pipe $1d$ resting on the sea bottom. While the assembly is being installed, it is desired to place the end of the undersea pipe $1d$ that is resting on the sea bottom close to the base $1_2$, e.g. in a target area having a radius of 15 m that is situated 40 m from the base $1_2$. As a result, the final shape of said junction pipe 3 is not known until after installing both the base $1_2$ and the undersea pipe $1d$ that is resting on the sea bottom. The junction pipe 3 is then prepared after taking very accurate measurements, in known manner, between the end of the male or female portion $1e$ of an automatic connector secured to the end of the bent pipe portion $1_3$, and the end of the male or female portion $1f$ of an automatic connector secured to the end of the pipe resting on the sea bottom $1d$. The axis BB of the automatic connector $1f$, corresponding to the female or male portion $3b$ of the automatic connector at one end of the junction pipe 3 generally extends in a direction that is very different from the axis AA of the male or female portion of the automatic connector $1e$ of the bent pipe portion $1_3$ corresponding to the female or male portion $3c$ of the automatic connector at the end of the junction pipe 3, as shown in FIG. 2. The junction pipe 3 is then made on the surface so as to have straight portions $3d$, large changes of direction, generally three or four or even more of them, implemented as bend segments $3c$, generally bending through an angle of 90°, so as to impart flexibility to the junction pipe 3. When the pipe $1d$ resting on the sea bottom is under pressure, its end lengthens a little and this elongation increases when the temperature of the oil increases. Thus, its end moves towards the base $1_2$. Similarly, in the event of said pipe being depressurized and cooled, it retracts and its end moves away from the base $1_2$. Thus, the numerous and large changes of direction in the junction pipe 3 are provided to impart flexibility to the assembly and to allow axial movements along AA and BB, while limiting bending stresses to acceptable levels in said junction pipe 3 as a whole.

When it is desired to keep the crude oil at a high temperature all along its route from the wellhead to the surface, it is advantageous to use insulated pipes, generally pipes of the PiP type. In contrast, the junction pipes 3 are not of the PiP type, but are generally insulated by shells of syntactic foam or coverings of thermoplastic insulating materials, made to measure and assembled one beside another all along its length. Those insulation systems are very difficult and expensive to fabricate and to install, and furthermore they are subject to cracking over time when they are installed on the sea bottom, because of the large temperature gradients to which they are subjected. Their outer walls are at the temperature of the sea water, i.e. 3° C. to 5° C., whereas in contact with the junction pipe the temperature of the oil may be as high as 60° C. to 90° C., or even higher.

The insulated junction pipe 3 of the invention is shown in FIGS. 6A, 6B, 6C, and 6D at various stages of its fabrication. It is constituted by:
- an inner pipe portion 4 made of steel made up of straight segments 4a and bend segments 4b, the end of said junction pipe being fitted with the female portion 3a of an automatic connector;
- a leaktight outer jacket 5 of plastics material and of circular section, presenting flexibility such as to enable it to be bent and to adapt to the radius of curvature of the bend segment 4b around which it is installed; and
- centralizer elements 6, 6a, 6b in the form of collars of rigid insulating material, preferably a plastics or a composite material, of circular cross-section and having said outer jacket resting on the peripheries thereof, thereby keeping the inner pipe 4 and the outer jacket 5 coaxial, and comprising:
  - leaktight centralizer elements 6a that prevent insulating fluid from passing through said leaktight centralizer;
  - non-leaktight centralizer elements 6b allowing insulating fluid to pass through orifices $6b_1$ that allow it to pass from one side to the other of said non-leaktight centralizer element; and
  - longitudinal guide elements 7 extending parallel to said inner pipe, there being at least three and preferably at least four guide elements secured to the peripheries of the centralizer elements 6.

The term "parallel" is used herein to mean that said guide elements are disposed at a constant distance from the inner pipe.

Figure 7A:
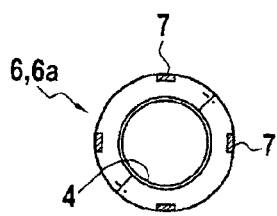
FIGS. 7A and 7B are sections respectively on planes CC and DD of FIG. 6A respectively through leaktight centralizers (FIG. 7A) and through centralizers having through orifices (FIG. 7B)
Figure 7B:
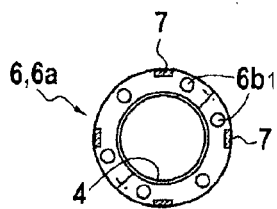
Figure 8:
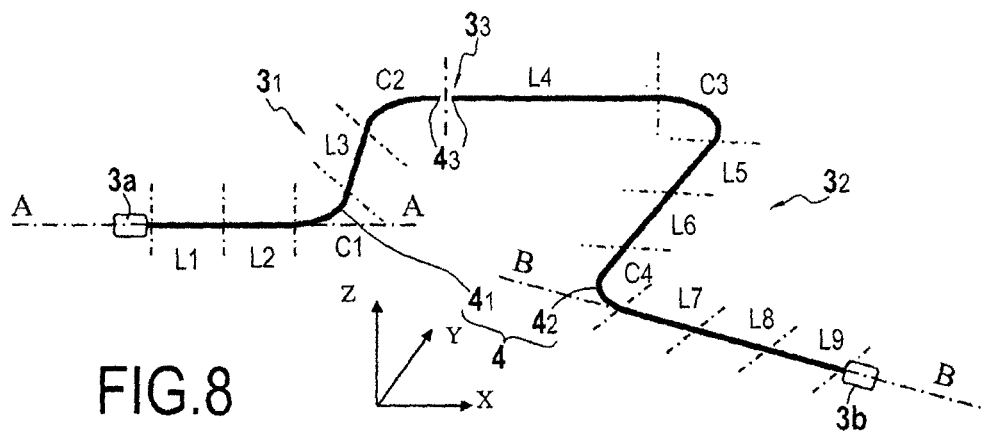
FIG. 8 is a view showing two portions of junction pipe each comprising a plurality of bend segments ($3c$) and of straight segments ($3d$)
Figure 8A:
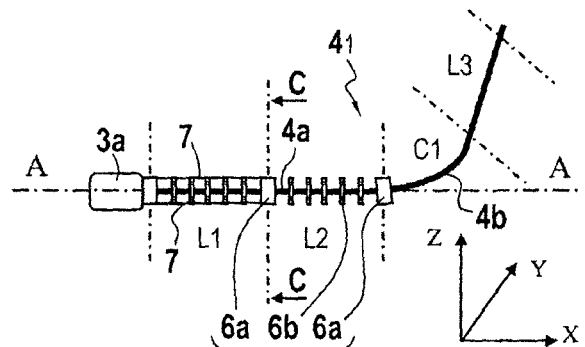
FIG. 8A is a plan view of the zone L1-L2 of FIG. 8 showing the centralizer elements and the lateral guide elements only.
Figure 8B:
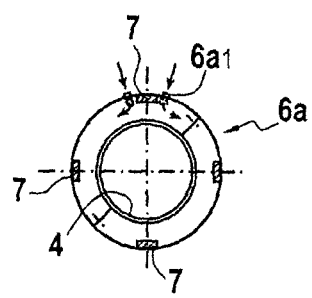
FIG. 8B is a section view on plane CC of FIG. 8A.

In FIGS. 7A, 7B, and 8B, it can be seen that the collars constituting the centralizer elements are made up of semi-tubular half-collars placed against each other and assembled around the inner pipe 4, in leaktight manner.

Figure 6A:
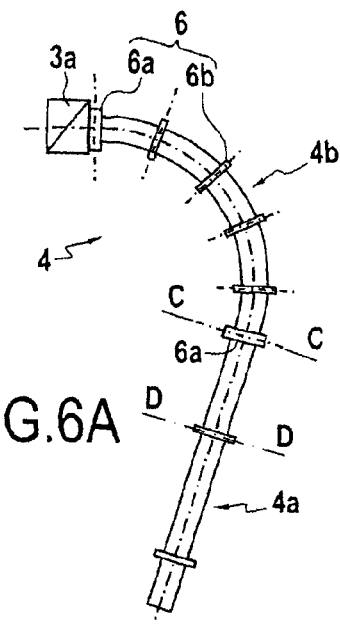
FIGS. 6A, 6B, 6C, and 6D are side views of a portion of junction pipe during various steps while installing an outer jacket.
Figure 6B:
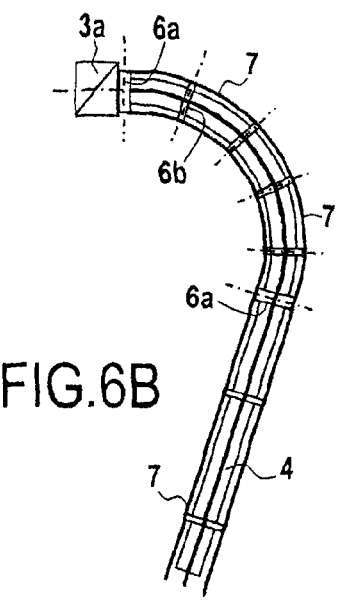
Figure 6C:
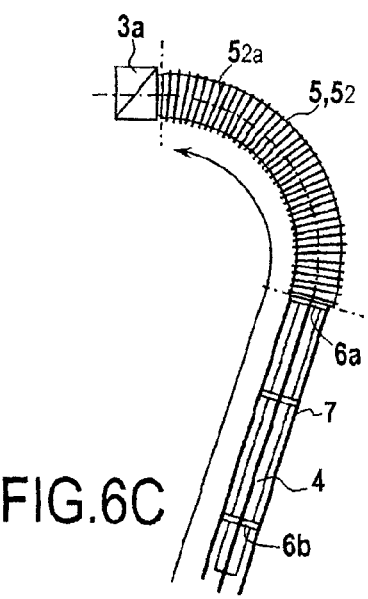

The flexible or semi-rigid outer jacket 5 can thus be threaded on from a free end of the inner pipe 4 that does not yet include its termination by means of an automatic connector 3a, 3b, and then taken to its final position by sliding over the guide elements 7 in register with the straight and bend portions 4a and 4b of the inner pipe, as shown in FIG. 6c. While the tubular wall of the outer jacket 5 is being threaded around the inner pipe 4, the outer jacket 5 is guided by the various guide elements 7 and above all by the fact that the jacket retains its substantially circular cross-section when it is curved, as explained below. Thus, the axial progress of said jacket is not impeded by the various centralizer elements 6a, 6b that present an outside diameter that is very slightly smaller than the inside diameter of said outer jacket.

FIG. 6A is a plan view of the end of the inner pipe fitted with automatic connector 3a, said inner pipe comprising a bend portion 4b and a straight portion 4a having leaktight and non-leaktight centralizer elements 6a and 6b preinstalled thereon, with the centralizer elements being closer together in the bend portion 4b than in the straight portion 4a. Finally, respective leaktight centralizer elements 6a are placed at the two ends of the bend segment 4b, these elements being a little larger than the non-leaktight centralizer elements so as to enable the ends of the outer jacket segments to be fastened thereto by binding said ends around and against the cylindrical peripheral surfaces of said leaktight centralizer elements 6a.

In FIG. 6B, guide elements 7 are installed "parallel" to the inner pipe 4, preferably continuously one after another along a direction that is "parallel" to a generator line of the inner pipe, and they are preferably distributed regularly around the peripheries of the centralizer elements 6a, 6b, as shown in FIGS. 7A and 7B, where they are four in number.

In FIG. 6C, a portion of flexible outer jacket 5 is threaded around a bend segment 4b of inner pipe from the free end of the straight segment 4a. The outer jacket segment 5 preferably extends from a first leaktight centralizer element 6a adjacent to the automatic connector 3a as far as a second leaktight centralizer element 6a at the other end of the bend segment 4b, said outer jacket segment thus covering four other centralizer elements 6b that are not leaktight. The ends of the segment of flexible outer jacket are firmly pressed against the end centralizer elements by binding means (not shown). Thus, the volume between the inner pipe 4b and the outer jacket 5 and the leaktight centralizer elements 6a is made leaktight. Said volume can then advantageously be filled through a closable orifice $6a_1$ shown in FIGS. 8B and 8C, with a quasi incompressible insulating compound that is transferred in the liquid state until said volume has been completely filled. Thereafter, the filler orifice $6a_1$ is closed in final and completely leaktight manner and said compound may polymerize after a few hours so as to cure into the form of a gel. By way of example, a polyurethane-kerosene gel is used from the supplier Arkema (France), which is transferred in the liquid state after mixing together its components, and which cures cold in a few hours to form a gel.

In order to ensure that the volume is completely filled, care is taken to place the segment in question at a sufficient slope to ensure that no pockets of air remain against the intermediate non-leaktight centralizers, and additional orifices situated tangentially to the outer jacket at the top portions of said non-leaktight centralizers may be used to further reduce the volumes of any said pockets of air that might become trapped.

Figure 6D:
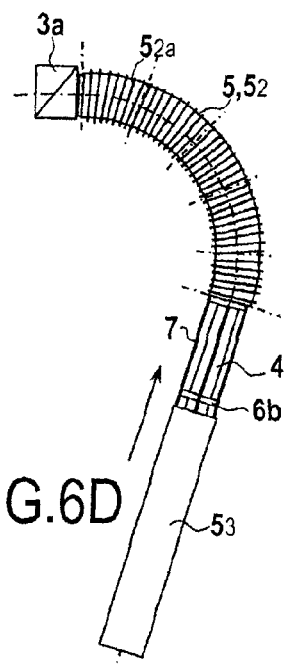

In FIG. 6D, a segment of rigid circular outer jacket $5_3$ is shown being threaded on, this segment being constituted from an extruded polyethylene or polypropylene pipe having a thickness of 4 mm to 15 mm, until it reaches a leaktight centralizer 6a. Thereafter the outer jacket is heated in uniform manner over a length of 10 cm to 20 cm, e.g. using hot air, and once it has softened it is bound in leaktight manner onto said end centralizer element 6a. The second end of said jacket segment $5_3$ is adjusted in length so as to co-operate with a second leaktight centralizer element 6a (not shown) around which it is bound in leaktight manner after being heated so as to be softened as explained above. It should be observed that it is possible to install a rigid outer jacket segment only on condition that the corresponding inner pipe portion does not have an end portion, and on condition that the straight portion does not have any bend portion after its free end via which said rigid jacket segment is threaded on. Specifically, the rigid straight outer jacket segment $5_3$ is fastened onto the leaktight centralizer element 6a that also has the end of the bend-forming flexible outer jacket segment $5_2$ fastened thereon, as can be seen in FIG. 6D.

Figure 3:
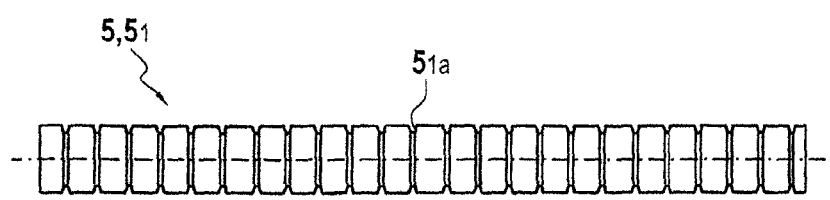
FIG. 3 is a side view of a semirigid corrugated jacket made of plastics material serving as an outer jacket for the insulated junction pipe of the invention.
Figure 3A:
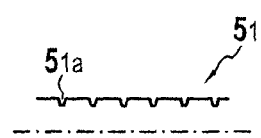

In FIG. 3, there can be seen a first version of an outer jacket constituting a semirigid outer jacket $5_1$ obtained from an extruded pipe of plastics material, in particular polypropylene having a thickness of 1 mm to 8 mm, and preferably 2 mm to 5 mm and presenting corrugations or grooves of rounded or hollow profile $5_1a$ that are regularly spaced apart every 5 cm to 10 cm in the axial longitudinal direction of the outer jacket.

Said corrugations are obtained directly during the fabrication process by localized hot deformation, prior to the extruded plastics material hardening on cooling. The corrugations present a width and a depth substantially equal to 1 cm to 2 cm, for an outer jacket having an overall diameter lying in the range 25 cm to 50 cm, preferably in the range 35 cm to 45 cm. Sheaths of this type are commonly used as sheaths for electrical ducting that is to be buried in the ground or incorporated in a building, and they are also used as drains.

The annular corrugations constitute reinforcing elements of the jacket, thereby making its shape rigid in cross-section and also enabling a substantially circular shape to be maintained for the cross-section of the jacket in spite of its taking up the shape of a bend, where appropriate.

Corrugated sheaths of this type are sold by the supplier Courant (France) under the reference "agricultural drain".

Figure 4:
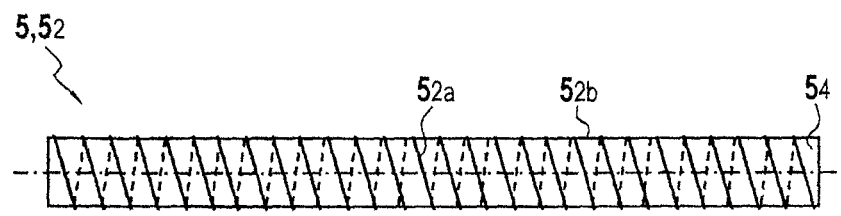
FIG. 4 is a side view of a flexible jacket of reinforced plastics material serving as an outer jacket for the insulated junction pipe of the invention.
Figure 4A:
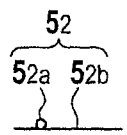
FIGS. 4A and 4B are section views showing the process for making the FIG. 4 jacket from a strip of reinforced fabric.
Figure 4B:
Figure 5:
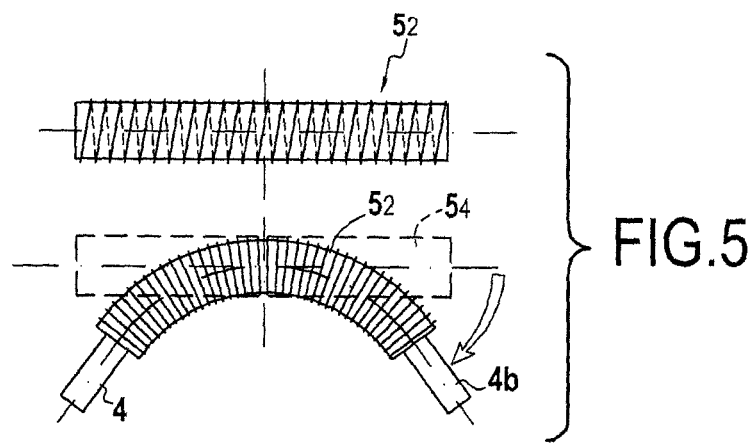
FIG. 5 is a side view of the FIG. 4 outer jacket being bent from a straight position in order to obtain a bent shape after it has been engaged around an inner pipe presenting a bend.

FIG. 4 shows a side view of a preferred second version $5_2$ of an outer jacket 5 of the invention, that presents greater flexibility. As shown in cross-section in FIGS. 4a and 4b, it is constituted by a ribbon $5_2b$ of plastics material or of polyurethane-coated waterproof fabric including a reinforcing element in the form of a wire or the like $5_2a$ made of steel, stainless steel, or of plastics material coated in thermoplastic material or in the material constituting said fabric, or indeed a polyamide or polypropylene string heat-sealed or adhesively bonded to said fabric. The string or wire extends along the longitudinal direction of said strip or ribbon. The flexible jacket $5_2$ is obtained by spiral-winding around a rigid mandrel $5_4$ of outside diameter that is slightly greater than the outside diameter of the centralizer elements 6a-6b, the turns being secured to one another during winding, e.g. by heat-sealing, by melting under a hot wheel or by ultrasound applied by a wheel, with their margins $5_5$ overlapping, as shown in FIG. 4B. After being spirally wound, the string or wire $5_2a$ forms a structural reinforcing element of helical shape, which acts like a spring in the same manner as the corrugations $5_1a$ of the first embodiment shown in FIG. 3, so as to maintain the substantially circular cross-section of the outer jacket in its substantially circular shape while it is being bent, as shown in FIG. 5. This type of jacket obtained by spirally-winding a strip or ribbon having a longitudinal reinforcing member is commonly used for fabricating large-diameter ventilation ducts, where such ducts are sold for example by the supplier Masterflex (France) under the reference Master-PUR-LAE. In addition, this embodiment is particularly preferred because by proceeding in this way, starting from a roll of reinforcing strip, it is possible to obtain an outer jacket having the desired diameter merely by changing the diameter of the mandrel on which said outer jacket is fabricated continuously. This embodiment is also advantageous because it is then possible to transport a large supply of strip of this type in a very small volume and to fabricate on site and on demand, to the appropriate diameter and length, such jacket elements as are needed for making the various segments of said junction pipe. The finished outer jackets, whether embodied as shown in FIG. 3 or FIG. 4, occupy a very large volume, even when strongly compressed, concertina-like.

FIG. 5 shows a flexible outer jacket segment $5_2$ in accordance with FIG. 4, shown straight in the top portion of the figure and in a bent position about a bent inner pipe portion 4b in the bottom portion of the figure.

The junction pipes 3 are of a very great variety of shapes and lengths. The shortest of them are 10 m to 15 m long, and the longest may reach or even exceed 100 m. Thus, in order to make all of a junction pipe, it is advantageous to proceed with a plurality of segments, as shown in FIG. 8. By way of example, the junction pipe presents a distance of 75 m between the ends of the automatic connectors 3a and 3b, and a developed length of 127 m. It is prepared as two segments $3_1$, $3_2$ that are, in a final stage, connected together by welding together the ends $4_3$ of the two steel inner pipe segments $4_1$ and $4_2$ at a position $3_3$. Fabrication of the inner pipe segment $4_1$ of the junction pipe segment $3_1$ includes installing the automatic connector 3a at its end, and then installing centralizer elements 6a, 6b and guide elements 7, and then threading from the end $4_3$, $3_3$ a first length L1 of semirigid outer jacket segment $5_1$ of the type shown in FIG. 3, and then a second length L2 of semirigid outer jacket segment $5_1$, and then a bent third length $C_1$ of flexible jacket of the $5_2$ type, then a straight fourth length L3 of semirigid outer jacket segment of the $5_1$ type, and finally a bent last length $C_2$ of flexible outer jacket $5_2$. In the same way, a second junction pipe portion $3_2$ is prefabricated from an inner pipe portion $4_2$ made up of a plurality of bend portions 4b and straight portions 4a with an automatic connector 3b at one of its ends. In the same manner centralizer elements 6a, 6b and guide elements 7 are applied to said inner pipe portion $4_2$. And then, in the same manner, semirigid and flexible outer jacket segments $5_1$ and $5_2$ are threaded onto the inner pipe, in the form of semirigid outer jacket segments $5_1$ that are straight and of lengths L4 to L9 and flexible outer jacket segments $5_2$ of lengths C3 to C4 for the bends. Nevertheless, the last straight segments of length L4 may be covered in a rigid outer jacket 6 since it does not need to go past a bend while it is being installed from the free end $4_3$ of the inner pipe portion $4_2$. Each of the outer jacket segments is bound in leaktight manner onto leaktight centralizer elements defining the ends of the various straight segments having the lengths L1 to L9 and bend segments having the lengths C1 to C4, with the exception of the right end of the last bend segment C2 of the junction pipe portion $3_1$. The left end of the length L4 of rigid outer jacket 6 may be bound in leaktight manner on a centralizer element situated at 30 cm to 40 cm from the end $4_3$ of the inner pipe portion $4_2$ so that the two inner pipe portions $4_1$ and $4_2$ can be welded together via their ends $4_3$ in order to form a welded assembly $3_3$ and thus constitute a junction pipe 3 by assembling together the two junction pipe portions $3_1$ and $3_2$. The curved outer jacket portion C2 is advantageously compressed concertina-like prior to welding together the ends $4_3$ so as to disengage from the welding zone and allow access for automatic welding machines. After a final pressure test to verify the weld between the ends $4_3$ of the inner pipe portions $4_1$ and $4_2$, the guide elements 7 for the weld zone are put into place and the flexible jacket C2 is deployed until it reaches the centralizer element 6a in common with the rigid outer jacket segment 6 of length L4, to which it is then bound in leaktight manner. Finally, the various lengths L1 to L9 and C1 to C4 are successively filled with insulating material in the fluid state so as to constitute an insulating gel after curing.

The leaktight centralizer elements 6a are shown as being wider than the non-leaktight centralizer elements 6b since they receive the ends of two jacket segments of outer jacket, each of which is bound in leaktight manner onto half of the width of said centralizer elements. The centralizer elements thus constitute hard points on which it is advantageous also to install a plurality of hoist slings needed for handling the assembly while it is being transported onto site and while it is being installed on the sea bottom between the undersea pipe 1d and the base $1_2$.

FIG. 8A shows the straight segments of lengths L1 and L2 of the straight inner pipe 4a fitted at their ends with leaktight centralizer elements 6a, and five intermediate non-leaktight centralizer elements 6b in each of the zones L1 and L2, and also with lateral guide elements 7 solely in the zone L1.

FIG. 8B is an end view in section on plane CC of FIG. 8A showing a leaktight centralizer element 6a with two closable orifices $6a_1$ enabling the insulating compound to be injected while in the liquid state, these orifices being situated in the top portion of the centralizer element, the right orifice serving to direct the composition that is injected into the zone L1, while the left orifice serves to direct the composition that is injected into the zone L2.

Figure 8C:
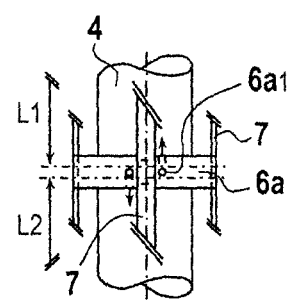
FIG. 8C is a plan view with reference to FIG. 8B.

FIG. 8C is a plan view relating to FIG. 8B, showing the path followed by the injected composition, respectively into the zones L1 and L2 from the two orifices $6a_1$, and showing the insertion limits of the outer jackets on the segments L1 and L2 where they cover the common leaktight centralizer element 6a onto which they are bound in order to cover said orifices $6a_1$ for inserting the insulating material, so as to release access from the outside to said orifices $6a_1$ and allow the insulating composition to be injected.

By way of example, the junction pipe of FIG. 8 presents a developed length of 127 m and is constituted by a steel inner pipe having an outside diameter of 200 mm and a thickness of 19 mm, a flexible or semirigid outer jacket having an inside diameter of 480 mm, which represents a thickness of 140 mm of gel. The various bends of the FIG. 8 junction pipe present radii of curvature that are equal to five times the outside diameter of the inner pipe. The assembly weighs 28.6 (metric) tonnes (t), comprising 10.7 t for the steel of the inner pipe, 1 t for the two automatic connectors, 19 cubic meters ($m^3$) of kerosene-polyurethane type gel having a relative density of 0.85, i.e. 16.1 t, and about 0.75 t of centralizers and outer jacket.

The 140 mm of gasoil-polyurethane gel from the supplier Arkema gives the pipe thermal performance (U-value) of 2.0 watts per square meter kelvin $W/(m^2.K)$, which is equivalent to a prior art thermal insulation system of the glass syntactic polyurethane (GSPU) foam type having a thickness of 180 mm.

Thus, the insulation system of the invention provides much better performance than that of the prior art using syntactic foam, is less expensive, is continuous over its periphery and along its length, and above all is not liable to crack over time, as happens with syntactic foam.

The conditions described above are based on assembling together straight pipe portions and junction pipe portions having plane bends, i.e. in which the axis of two assembled-together pipe portions continues to be contained in a common plane. However, it would not go beyond the spirit to the invention if said assembled-together pipe portions were to be arranged as a pigtail, i.e. with an axis in a substantially helical configuration over all or part of its length.

The invention claimed is:

1. A thermally insulating undersea junction pipe providing a junction between two thermally insulating undersea pipe portions, said junction pipe comprising a rigid bent inner pipe, and presenting a radius of curvature that is three to ten times its outside diameter, and coated in a thermally insulating material, comprising:
    an outer jacket surrounding said inner pipe, the jacket being made of flexible or semirigid material matching the bent shape of said inner pipe in a coaxial manner; and
    the tubular wall of said outer jacket including structural reinforcing elements of annular or helical shape suitable for enabling said tubular wall of the outer jacket to be bent while keeping its cross-section substantially uniform, and coaxial with the cross-section of said inner pipe, in spite of being bent to match the bent outline of said inner pipe with its said radius of curvature;
    wherein the junction pipe includes:
    a plurality of support elements, referred to as centralizer elements, made of rigid plastics or composite material interposed between said inner pipe and said outer jacket so as to keep the cross-sections of said outer jacket and said inner pipe substantially coaxial, said centralizer elements being spaced apart in the axial direction of said pipe at intervals of at least 1 m,
    a plurality of longitudinal guide elements made of rigid or semirigid material placed at a substantially constant distance from the surface of the bent inner pipe, extending between two successive centralizer elements having the ends of said longitudinal guide elements resting on the peripheries thereof, said longitudinal elements being constituted by section members of composite plastics material or steel capable of supporting said outer jacket without deforming; and
    a quasi incompressible thermally insulating material in the form of a gel completely filling the annular space between said inner pipe and said outer jacket.

2. The junction pipe according to claim 1, wherein said outer jacket presents an extruded solid tubular wall and said structural reinforcing elements are elements of annular shape constituted by recessed grooves, corrugations, or fluting regularly spaced apart in the longitudinal axial direction of said tubular wall of circular cross-section.

3. The junction pipe according to claim 1, wherein said tubular wall is constituted by a spiral winding of a strip or ribbon of plastics material or of flexible fabric coated in a polymer including said structural reinforcing element of helical shape constituted by a wire or string of iron or semirigid plastics material.

4. The junction pipe according to claim 3, wherein said structural reinforcing element of helical shape constituted by a wire or string of iron or semirigid plastics material comprises a wire or string having a diameter of 1 mm to 8 mm that is adhesively bonded or heat-sealed onto the outside surface of the ribbon or that is embedded in the mass of the material constituting said ribbon, thereby forming a projection at the outside surface of said ribbon.

5. The junction pipe according to claim 1, including leaktight centralizer elements having closable orifices enabling the space between two successive leaktight centralizer elements to be filled with fluid insulating material, there being at least one leaktight centralizer element at each end, of said junction, and non-leaktight centralizer elements including openings allowing insulating material fluid to flow through said openings in said non-leaktight centralizer elements while filling between two consecutive leaktight centralizer elements.

6. The junction pipe according to claim 5, wherein said centralizer elements are constituted by collars of rigid material placed around and against said inner pipe and having said outer jacket resting thereagainst.

7. The junction pipe according to claim 1, wherein said insulating gel comprises a first compound presenting thermal insulation properties, having a hydrocarbon chain with at least six carbon atoms, mixed with a second compound consisting in a gelling or structuring-effect polymer compound said first compound preferably being in the form of particles or microcapsules dispersed within a matrix of said gelled or cured second compound, said matrix thereby confining said insulating first compound.

8. The junction pipe according to claim 7, wherein said insulating gel is a mixture of kerosene and of polyurethane.

9. The junction pipe according to claim 7, wherein said first compound comprises alkanes, wherein said at least six carbon atoms comprises at least ten carbon atoms, and wherein said second compound operates by curing, such as a compound of the polyurethane, polypropylene, polyethylene, or silicone type.

10. The junction pipe according to claim 1, including a coupling element at each end, comprising a male or female portion of an automatic connector.

11. The junction pipe according to claim 1, including at least two bent pipe segments spaced apart by at least one straight pipe segment.

12. A method of fabricating a thermally insulated junction pipe according to claim 1, wherein the method comprises the following steps:
1) applying centralizer elements, regularly spaced apart, to the surface of a said bent inner pipe using at least two leaktight centralizer elements located respectively at each end and non-leaktight centralizer elements between the end leaktight centralizer elements;
2) applying said longitudinal guide elements extending over and between said successive centralizer elements on which they rest and, where appropriate, are fastened;
3) threading a said flexible or semirigid outer jacket around said inner pipe, the ends of said outer jacket being bound around and against at least said end centralizer elements; and
4) completely filling the empty space between said inner pipe and said outer jacket with a said thermally insulating material poured in in the liquid state, via closable orifices in said leaktight centralizer elements.

13. The method according to claim 12, wherein a said junction pipe is fabricated comprising a plurality of bend segments and a plurality of straight segments, and wherein the method further comprises the following steps:
1) making two portions of said inner pipe, each portion including at least one bend segment, and at least one straight segment;
2) applying said centralizer elements to said inner pipe portions and said guide elements to said centralizer elements, preferably with leaktight centralizer elements defining the ends of each of the bend and straight segments;
3) threading segments of said flexible or semirigid outer jacket around said bend or straight segments of said inner pipe portions over said centralizer elements and said guide elements;
4) securing said outer jacket segments, via said leaktight centralizer elements at the ends of each of said straight and bend segments of the inner, with the exception of a first end segment of at least one of said junction pipe portions as made in this way, so as to enable said outer jacket end to be folded back from the weld zone of step 5);
5) assembling together two ends of said two inner pipe portions together end to end by welding;
6) joining together the ends of two terminal segments of said flexible or semirigid outer jackets in register with the weld zone of step 5); and
7) filling said empty spaces between said outer jacket segments and said inner pipe segments with thermally insulating materials poured in liquid form, via closable orifices in said leaktight centralizer elements at the end of said segments.

14. The junction pipe according to claim 1, wherein the radius of curvature is four to five times its outside diameter, wherein the cross-section of the tubular wall is substantially circular, wherein the plurality of longitudinal guide elements comprise at least four of guide elements which are regularly distributed around the peripheries of said centralizer elements, and wherein said centralizer elements are spaced apart in the axial direction of said pipe at intervals of at least 3 m to 10 m.

* * * * *